United States Patent [19]

Kobayashi et al.

[11] Patent Number: 4,500,686
[45] Date of Patent: Feb. 19, 1985

[54] POLYESTER TYPE BLOCK COPOLYMER COMPOSITION

[75] Inventors: Takuma Kobayashi; Hironobu Kitagawa; Shigeo Kobayashi, all of Otsu, Japan

[73] Assignee: Toyo Boseki Kabushiki Kaisha, Osaka, Japan

[21] Appl. No.: 476,652

[22] Filed: Mar. 18, 1983

[30] Foreign Application Priority Data

Mar. 19, 1982 [JP] Japan ................... 57-44908

[51] Int. Cl.$^3$ ................... C08L 67/02; C08L 67/04
[52] U.S. Cl. ................... 525/408; 525/411; 525/437; 525/438; 525/449; 528/297
[58] Field of Search ............... 525/437, 438, 411, 449, 525/408; 528/297

[56] References Cited

U.S. PATENT DOCUMENTS

| | | | |
|---|---|---|---|
| 2,863,855 | 12/1958 | Wilson | 521/177 |
| 3,560,605 | 2/1971 | Siggel | 525/438 |
| 3,657,191 | 4/1972 | Titzmann | 525/437 |
| 3,835,089 | 9/1974 | Fox | 525/411 |
| 3,869,427 | 3/1975 | Meschke | 525/437 |
| 3,886,104 | 5/1975 | Borman | 525/438 |
| 3,892,821 | 7/1975 | Koleske | 525/411 |
| 4,016,142 | 4/1977 | Alexander | 525/437 |
| 4,130,541 | 12/1978 | Lazarus | 525/437 |
| 4,144,285 | 3/1979 | Maschek | 525/437 |
| 4,222,928 | 9/1980 | Kawamura | 525/438 |
| 4,229,553 | 10/1980 | Sterzel | 525/438 |
| 4,246,378 | 1/1981 | Kometani | 525/438 |
| 4,374,960 | 2/1983 | Rothwell | 525/436 |

FOREIGN PATENT DOCUMENTS

| | | | |
|---|---|---|---|
| 1955902 | 6/1969 | Fed. Rep. of Germany | 525/437 |
| 48-00991 | 1/1973 | Japan . | |

*Primary Examiner*—John C. Bleutge
*Assistant Examiner*—Patricia Short

[57] ABSTRACT

An improved polyester type block copolymer composition having a rubber-like elasticity, particularly having excellent heat resistance and water resistance, which comprises a polyester type block copolymer produced from a crystalline aromatic polyester and a lactone in melt-admixture with at least one epoxy compound and optionally further with a carboxylic acid compound selected from an ethylene-carboxylic acid copolymer and an aliphatic carboxylic acid metal salt.

2 Claims, No Drawings

POLYESTER TYPE BLOCK COPOLYMER COMPOSITION

The present invention relates to an improved polyester block copolymer composition having a rubber-like elasticity, more particularly, to an improvement in heat resistance and water resistance of a polyester type block copolymer produced by reacting an aromatic polyester and a lactone.

It is well known to produce polymers by reacting an aromatic polyester and a lactone, for example, by reacting a crystalline aromatic polyester and a lactone (cf. Japanese Patent Publication No. 4116/1973); by reacting a crystalline aromatic polyester and a lactone, followed by reacting the resulting block prepolymer with a polyfunctional acylating agent to extend the chain of the polymer (cf. Japanese Patent Publication No. 4115/1973); or by polymerizing a lactone in the presence of a crystalline aromatic polyester in solid state (cf. Japanese Patent Publication No. 49037/1977). These known polymers have excellent rubber-like elasticity and light resistance, but when they are exposed at a high temperature for a long period of time, they show remarkably lowered strength and elongation. Besides, these polymers are easily hydrolyzed with water, and hence, they can not practically be used as fibers, films or molding materials unless they are modified.

It is also known that a stabilizer such as polycarbodiimide is added to the polyesters in order to give hydrolysis resistance thereto, and it is effective for giving the resistance to hydrolysis, but this method is disadvantageous in the high cost and also in that when the composition is heated for a long period of time, it results in change of color. In order to improve heat resistance of the polyesters, it is suggested to add a stabilizer such as hindered phenol compounds or nitrogen compounds. However, according to the experiments by the present inventors, these stabilizers were slightly effective for improvement in heat resistance of crystalline aromatic polyester-lactone elastomer.

The present inventors have intensively studied an improved method for obtaining a polyester composition having excellent heat resistance and hydrolysis resistance. As a result, it has been found that an epoxy compound is effective, that is, when a polyester type block copolymer produced by reacting a crystalline aromatic polyester and a lactone is melt-admixing with a mono- or poly-functional epoxy compound in an amount of 0.3 to 10% by weight based on the weight of the block copolyester, there can be obtained a polyester elastomer having excellent heat resistance and hydrolysis resistance. It has also been found that when a carboxylic acid compound selected from an ethylene-carboxylic acid copolymer and an aliphatic carboxylic acid metal salt is further incorporated into the composition, the polyester elastomer shows further improved properties such as excellent moldability, mechanical characteristics and transparency.

An object of the present invention is to provide an improved polyester type block copolymer composition having a rubber-like elasticity, particularly improved in heat resistance and water resistance. Another object of the invention is to provide an improvement of properties of polyester type block copolymer composition by incorporating an epoxy compound. A further object of the invention is to provide a further improvement of additional properties of polyester type block copolymer composition by incorporating a combination of an epoxy compound and a carboxylic acid compound selected from an ethylene-carboxylic acid copolymer and an aliphatic carboxylic acid metal salt. These and other objects and advantages of the invention will be apparent to those skilled in the art from the following description.

The desired improved polyester type block copolymer composition of the present invention comprises a polyester type block copolymer produced by reacting a crystalline aromatic polyester and a lactone in melt-admixture with one or more mono- or poly-functional epoxy compound.

The crystalline aromatic polyester used in the present invention is a polymer being predominantly formed by ester linkages or a combination of ester linkage and ether linkages which has a main repeating unit of at least one aromatic group and has a terminal hydroxy group. The crystalline aromatic polyester has preferably a melting point of 150° C. or higher in case of a high degree of polymerization. For the purpose of utilizing the final composition as a molding material, the crystalline aromatic polyester has preferably a molecular weight of not less than 5,000, more preferably not less than 8,000. For the purpose of utilizing the final composition as an adhesive or coating material, the polyester may have a molecular weight of less than 5,000.

Suitable examples of the crystalline aromatic polyester are homopolyesters such as polyethylene terephthalate, polytetramethylene terephthalate, poly-1,4-cyclohexylenedimethylene terephthalate, polyethylene 2,6-naphthalate; polyester ethers such as polyethylene hydroxybenzoate, poly-p-phenylene bishydroxyethoxyterephthalate; copolyesters or copolyester ethers which comprise mainly tetramethylene terephthalate unit or ethylene terephthalate unit and other copolymer components such as tetramethylene or ethylene isophthalate unit, tetramethylene or ethylene adipate unit, tetramethylene or ethylene sebacate unit, 1,4-cyclohexylenedimethylene terephthalate unit, or tetramethylene or ethylene p-hydroxybenzoate unit, or the like. In case of copolymers they contain preferably 60 molar % or more of tetramethylene terephthalate unit or ethylene terephthalate unit.

The lactone is most preferably ε-caprolactone, but other lactones such as enantholactone or caprilolactone may also be used. Two or more lactones may be used together.

The above crystalline aromatic copolyester and lactone can be copolymerized in an appropriate ratio, which depends on the kinds of utilities of the final composition. Generally, when the amount of the aromatic polyester is larger, the polymer becomes harder and shows more improved mechanical characteristics such as strength, and on the other hand, when the amount of the lactone is larger, the polymer becomes softer and shows more improved properties at a low temperature. Accordingly, it is preferably to use the aromatic polyester/lactone in the ratio of 97/3 to 5/95 by weight, more preferably 95/5 to 30/70 by weight. For example, in order to obtain a hard molded product, the above ratio is preferably in the range of 95/5 to 70/30 by weight.

The reaction of the crystalline polyester and the lactone for producing the desired polyester type block copolymer may be carried out in the presence or absence of a catalyst.

The epoxy compound used in the present invention is not specifically restricted as far as it has at least one epoxy group within the molecule. Suitable epoxy compounds are the compounds of the following formulae (I), (II) and (III):

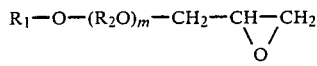  (I)

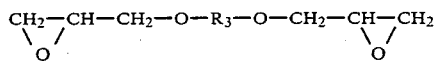  (II)

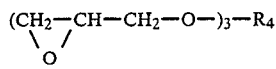  (III)

wherein $R_1$ is a hydrocarbon group having 1 to 10 carbon atoms, $R_2$ is an alkylene group having 1 to 4 carbon atoms, $R_3$ is a divalent hydrocarbon group having 1 to 20 carbon atoms or $-(R_2O)_m-R_2-$, $R_4$ is a trivalent hydrocarbon group having 3 to 20 carbon atoms, and m is an integer of 0 to 20.

Suitable examples are methyl glycidyl ether, phenyl glycidyl ether, ethylene glycol diglycidyl ether, diethylene glycol diglycidyl ether, polyethylene glycol monophenyl monoglycidyl ether, glycerine triglycidyl ether, or the like.

The above epoxy compounds have preferably an epoxy value of 0.9 to 14 equivalent/kg.

Di- or more functional epoxy compounds, e.g. di- or tri-functional epoxy compounds of the formulae (II) and (III) are preferably used, and optionally, monoepoxy compound is used in combination.

The required amount of the epoxy compound depends on the amount of terminal groups of the polyester type block copolymer to be produced, but is usually in the range of 0.1 to 20% by weight, preferably 0.3 to 10% by weight, based on the weight of the polyester type block copolymer. When the amount is smaller than 0.1% by weight, the effect of the epoxy compound is less exhibited, but on the other hand, when the amount is over 20% by weight, the molded product obtained from the final composition shows disadvantageously crude surface due to the unreacted epoxy compound.

When the epoxy compound is melt-admixed with the polyester type block copolymer, the reaction of the polyester type block copolymer and the epoxy compound may be carried out without using any catalyst, but is remarkably promoted by using a catalyst. The catalyst includes all conventional catalysts which are usually used in a reaction of epoxy compounds, for example, amines and phosphorus compounds. Particularly suitable examples of the catalyst are trivalent phosphorus compounds such as tributylphosphine and triphenylphosphine. These catalysts may be used in combination of two or more thereof. The above epoxy compounds and catalysts may be added to the reaction system either at one time or portionwise.

In addition to the epoxy compounds, a carboxylic acid compound selected from an ethylene-carboxylic acid copolymer and an aliphatic carboxylic acid metal salt may be added to the composition in order to improve further properties of the composition.

The ethylene-carboxylic acid copolymer used in the invention is preferably a random copolymer containing about 25 to 98.5% by weight of ethylene unit and about 1.5 to 30% by weight of carboxylic acid unit. The copolymer may also contain a small amount of an alkylene unit such as propylene unit and butylene unit. There may be used as the ethylene-carboxylic acid copolymer a graft copolymer which is produced by copolymerizing ethylene and a small amount of other α-olefin (e.g. propylene) or a diene compound (e.g. hexadiene) and graft-copolymerizing the copolymer with a carboxylic acid monomer. Suitable examples of the ethylene-carboxylic acid copolymer are copolymers of ethylene with acrylic acid, methacrylic acid, maleic acid, fumaric acid, monoethyl maleate, monomethyl maleate, etc.

The above polymer can be made by the inclusion of such polymeric units as methyl acrylate, ethyl acrylate and the like in an amount up to about 60% by weight of the total polymer composition. The acid groups contained in the ethylene-carboxylic acid copolymer may be neutralized with a metallic ion. Suitable examples of the metallic ion are an alkali metal ion, an alkaline earth metal ion, zinc ion, or the like.

The ethylene-carboxylic acid copolymer is usually incorporated into the composition in an amount of 1 to 40% by weight, preferably 3 to 20% by weight, based on the weight of the polyester type block copolymer. When the amount is less than 1% by weight, it is less effective on enhancing crystallizability of the polyester type block copolymer due to less dispersibility thereof, and on the other hand, when the amount is over 40% by weight, it induces undesirable phase separation of the composition, which results in lowering of strength of the product.

Besides, a polycarbodiimide may also incorporated into the composition in order to raise the melting temperature of the composition. The polycarbodiimide includes a compound of the formula:

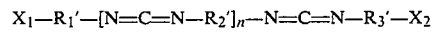

wherein $R_1'$, $R_2'$ and $R_3'$ are each a divalent aliphatic hydrocarbon group having 1 to 12 carbon atoms, a divalent alicyclic hydrocarbon group having 6 to 15 carbon atoms or a divalent aromatic hydrocarbon group having 6 to 15 carbon atoms, $X_1$ and $X_2$ are each a group of the formula:

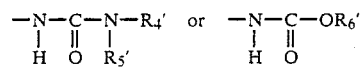

(wherein $R_4'$, $R_5'$ and $R_6'$ are each an aliphatic hydrocarbon group having 1 to 12 carbon atoms, an alicyclic hydrocarbon group having 5 to 15 carbon atoms or an aromatic hydrocarbon group having 6 to 15 carbon atoms, and $R_4'$ and $R_5'$ may also be hydrogen atom), and n is 2 to 30. The polycarbodiimide may be used in an amount of about 0.2 to 30% by weight, preferably about 2 to 8% by weight, based on the weight of the polyester type block copolymer.

The aliphatic carboxylic acid metal salt used in the present invention includes salts of an aliphatic monocarboxylic acid or di- or more valent polycarboxylic acid having 10 or more carbon atoms, such as stearic acid, sebacic acid, octadecylsuccinic acid, octadecenylsuccinic acid, docosanedicarboxylic acid, dimer acid, trimer acid or a mixture thereof with a metal of the group I-a or II-a in periodic table. The dimer acid means a dicarboxylic acid having 36 carbon atoms which is prepared by dimerizing an unsaturated aliphatic acid having 18 carbon atoms, and the trimer acid means a tricarboxylic acid which is prepared by trimerizing an unsaturated aliphatic acid having 18 carbon atoms. The aliphatic polycarboxylic acid preferably contains 20 or more carbon atoms, more preferably 26 to 54, and preferably has a molecular weight of not more than about 1.500, more preferably about 450 to 1,000 and has preferably a carboxyl group of one or more, more preferably 2 to 4, per one molecule. Besides, aliphatic polycarboxylic acid having substantially no unsaturated bond is preferred because of less coloring. The dimer acid and trimer acid are preferably converted into saturated aliphatic acids by hydrogenation thereof.

Suitable examples of the metal are, for example, lithium, sodium, potassium, calcium, barium, or the like, which are used alone or in mixture thereof. The aliphatic carboxylic acid is neutralized with these metals. The aliphatic carboxylic acid is preferably neutralized in 90% or more of the carboxyl groups. The metal salts of aliphatic carboxylic acids may be used in a mixture of two or more thereof.

The metal salts of aliphatic carboxylic acid are used in an amount of about 0.1 to 15% by weight, preferably 0.5 to 10% by weight, based on the weight of the polyester type block copolymer. When the amount of the aliphatic carboxylic acid metal salt is less than about 0.1% by weight, it is less effective on improvement of moldability, and on the other hand, when the amount is over about 15% by weight, it gives undesirable effect on the mechanical characteristics of the product.

The polyester type block copolymer composition of the present invention may also be incorporated with a heat stabilizer and weathering agent in order to improve further the heat stability and weatherability of the composition, and further incorporated with other conventional additives such as pigments, etc.

The heat stabilizer includes the conventional hindered phenol compounds (e.g. pentaerythritol tetrakis[3-(3,5-di-tert-butyl-4-hydroxyphenyl)propionate], etc.), sulfur compounds (e.g. dilaurylthio dipropionate, etc.) and diphenylamine compounds. The hindered phenol compounds and sulfur compounds include all known compounds as disclosed in literatures, for example in Japanese Patent Publication Nos. 37422/1971 and 26535/1972. The diphenylamine compounds include, for example, 4,4'-bis($\alpha,\alpha$-dimethylbenzyl)diphenylamine, 4,4'-bis($\alpha$-methylbenzyl)diphenylamine, 4,4'-bis($\alpha,\alpha$-diethylbenzyl)diphenylamine, 4,4'-bis($\alpha$-ethylbenzyl)diphenylamine, 4,4'-bis($\alpha$-methyl-$\alpha$-ethylbenzyl)diphenylamine, 4-($\alpha$-methylbenzyl)-4'-($\alpha'$-ethylbenzyl)diphenylamine, 4,4'-bisbenzyldiphenylamine, or the like.

These heat stabilizers are used in an amount of 0.05 to 5% by weight, preferably 0.1 to 1.0% by weight, based on the weight of the polyester type block copolymer. When the amount of the heat stabilizer is too much, for example, more than 5% by weight, the heat stabilizer is disadvantageously precipitated within the composition. Among the above heat stabilizers, hindered phenol compounds are most suitable.

When the heat stabilizer is incorporated into the composition together with an epoxy compound, there can be obtained the desired elastomer having particularly excellent heat resistance and hydrolysis resistance.

The weathering stabilizer used in the present invention includes the conventional compounds, such as benzotriazole compounds (e.g. 2-(2'-hydroxy-3',5'-di-tert-butylphenyl)-5-chlorobenzotriazole, etc.), hindered amine compounds (e.g. bis(2,2,6,6-tetramethyl-4-piperidyl)sebacate, etc.), and substituted benzophenone compounds (e.g. 2-hydroxy-4-n-octyloxybenzophenone, etc.). These weathering stabilizers are used in an amount of 0.05 to 5% by weight, preferably 0.1 to 1.0% by weight, based on the weight of the polyester type block copolymer. When the amount is too much, for example over 5% by weight, the weathering stabilizer is disadvantageously precipitated within the composition. Among the above weathering stabilizers, benzotriazole compounds are most suitable.

When the weathering stabilizer is incorporated into the composition together with an epoxy compound, there can be obtained the desired elastomer having particularly excellent water resistance and weatherability.

The improved polyester type block copolymer composition of the present invention can be prepared by conventional methods, for example, by mixing polyester type block copolymer chips with an epoxy compound, catalyst and other additives and uniformly melt-admixing with heating. The melt-admixing is preferably carried out at a temperature of 3° C. higher than the melting point of the crystalline elastomer to 280° C. for about 30 seconds to 120 minutes. The mixing period may vary according to the kinds of mixing methods and temperature.

According to the present invention, the properties of the composition are improved. For example, by incorporating a mono- or poly-functional epoxy compound, there can be obtained a polyester elastomer having excellent heat aging resistance and hydrolysis resistance. By incorporating additionally a carboxylic acid compound selected from an ethylene-carboxylic acid copolymer and an aliphatic carboxylic acid metal salt, which have good compatibility with the polyester type block copolymer, the composition shows greatly improved moldability, mechanical characteristics and transparency. Besides, the composition comprising a polyester type block copolymer an epoxy compound and a carboxylic acid compound shows rapid crystallizability and remarkably improved melt viscosity, and hence, can be molded not only by injection molding but also by blow molding. This composition shows excellent heat aging resistance hydrolysis resistance, transparency and frictional characteristics without deteriorating the original properties of the block copolymer, and hence, can be used for various utilities, such as injection moldings, blow moldings and extrusion moldings useful as parts of various machines (e.g. name plates, automobile parts, switches, holders, hooks, packings, etc), coatings (e.g. wire coatings), and the like.

The present invention is illustrated by the following Examples but should not be construed to be limited thereto. In Examples, the various properties were measured by the following methods.

(1) Reduced specific viscosity
It was measured under the following conditions:
Solvent: Phenol/tetrachloroethane (6/4 by weight)
Concentration: 50 mg/25 ml
Temperature: 30° C.

(2) Melt index
It was measured by the method as defined in Japanese Industrial Standards (JIS) K6760 at 230° C.

(3) Amount of terminal carboxyl groups
A sample (100 mg) of a polyester elastomer and benzyl alcohol (10 ml) were taken in a vessel, and the mixture was dissolved with stirring at 200° C. for 2 minutes, 4 minutes and 6 minutes. After each dissolution treatment, the mixture was cooled with water and diluted with chloroform (10 ml). Each solution was tritrated with 0.1N sodium hydroxide-benzyl alcohol solution by using phenolphthalein as an indicator, and thereby, the amount of carboxyl groups in each dissolution time was measured. Based on the data thus obtained, the value at zero point (dissolution time: zero) was calculated by extrapolation. The value at zero point thus obtained was shown as the amount of terminal carboxyl groups.

(4) Tensile strength and tensile elongation

The starting chips were pressed with heat-pressing to form a plane plate (thickness: 2 mm), which was punched to obtain a Dumbbell-shaped test piece. The test piece was drawn at a rate of 50 mm/minute, and the weight (kg) of load was measured at break of the test piece. The tensile strength (kg/cm$^2$) was shown by a value obtained by dividing the load (kg) at break by the initial sectional area (cm$^2$) of the test piece. The tensile elongation (%) was shown by a ratio of elongation of test piece at break to the length of the starting test piece.

(5) Wearing properties

A test piece as prepared in the above (4) was rubbed with a wheel of a tapered wear tester OS-17 under a load of one kg for 1,000 cycles, and then, the reduced weight (mg) of the test piece was measured.

(6) Heat aging resistance

A test piece as prepared in the above (4) was put in an autoclave at 150° C. for a predetermined time, and then, the tensile strength and tensile elongation of the resulting test piece were measured in the same manner as described in the above (4).

(7) Weatherability

A test piece as prepared in the above (4) was treated in the following manners (a), (b) and (c), and then, the tensile strength and tensile elongation of the resulting test piece were measured likewise.

(a) Treatment with a fadeometer

The test piece was treated with a fadeometer (illuminant: ultraviolet carbon) at a black panel temperature of 63±3° C. for a predetermined time.

(b) Treatment with a weatherometer

The test piece was treated with a weatherometer (illuminant: carbon, twin-arc) at a black panel temperature of 63±3° C. at a ratio of spraying time/ultraviolet irradiation time=2/8 for a predetermined time.

(c) QUV test

The test piece was repeatedly subjected to ultraviolet irradiation for 4 hours, treatment at 60° C. with sweating for 4 hours and treatment at 50° C. by using a QUV accelerated weathering tester (illuminant: 400 nm–315 nm ultraviolet lamp).

PREPARATION 1

Polytetramethylene terephthalate (70 kg) and -caprolactone (30 kg) were charged into a reactor. After purging the reactor with nitrogen gas, the mixture was melt-reacted with stirring at 230° C. for 2 hours. The unreacted -caprolactone was removed in vacuum. The polyester elastomer thus obtained had a reduced specific viscosity of 1.163, an acid value of 65 equivalent/10$^6$ g, and further had a tensile strength at break of 371 kg/cm$^2$ and a tensile elongation at break of 708%.

EXAMPLE 1

The polyester type block copolymer chips (1.5 kg) prepared in Preparation 1, phenyl glycidyl ether (30.0 g) and triphenylphosphine (1.3 g) were charged into a drum tumbler, and the mixture was stirred at room temperature for 30 minutes. The resulting mixture was extruded with a biaxial extruder (40 mm$\phi$). After cooling with water, the extruded product was cut to give chips. The resulting chips had a reduced specific viscosity of 1.044, a tensile strength at break of 354 kg/cm$^2$ and a tensile elongation at break of 680%.

EXAMPLE 2

The polyester type block copolymer (1.5 kg) prepared in Preparation 1, diethylene glycol diglycidyl ether (22.0 g) and triphenylphosphine (1.3 g) were charged into a drum tumbler, and the mixture was stirred and treated in the same manner as described in Example 1. The chips thus obtained had a reduced specific viscosity of 1.540, a tensile strength at break of 397 kg/cm$^2$ and a tensile elongation at break of 478%.

EXAMPLE 3

The polyester type block copolymer (1.5 kg) prepared in Preparation 1, phenyl glycidyl ether (15.0 g), diethylene glycol diglycidyl ether (11.0 g) and triphenylphosphine (1.3 g) were charged into a drum tumbler, and the mixture was treated in the same manner as described in Example 1. The chips thus obtained had a reduced specific viscosity of 1.212, a tensile strength at break of 385 kg/cm$^2$ and a tensile elongation at break of 650%.

REFERENCE EXAMPLE 1

The polyester type block copolymer (1.5 kg) prepared in Preparation 1 and pentaerythritol-tetrakis[3-(3,5-di-tert-butyl-4-hydroxyphenyl)propionate] (Irganox 1010®, manufactured by Ciba-Geigy, 4.5 g) were charged into a drum tumbler. After mixing, the mixture was extruded with a biaxial extruder (40 mm$\phi$) at 230° C. After cooling with water, the extruded product was cut to give chips. The resulting chips had a reduced specific viscosity of 1.043, a tensile strength at break of 345 kg/cm$^2$ and a tensile elongation at break of 710%.

REFERENCE EXAMPLE 2

The polyester type block copolymer (1.5 kg) prepared in Preparation 1 and 4,4'-bis($\alpha,\alpha$-dimethylbenzyl)diphenylamine (Naugard 445®, manufactured by Uniroyal Co., 4.5 g) were charged into a drum tumbler, and the mixture was extruded with a biaxial extruder in the same manner as described in Example 1 and then cut to give chips likewise. The chips had a reduced specific viscosity of 1.042, a tensile strength at break of 310 kg/cm$^2$ and a tensile elongation at break of 670%.

EXAMPLE 4

The chips prepared in Preparation 1, Examples 1, 2 and 3, and Reference Examples 1 and 2 were dried at 100° C. in vacuum and then were formed into a sheet (thickness: 2 mm) with hot-pressing. Dumbbell-shape test pieces were prepared from the sheet. The test pieces were kept in a gear oven at 140° C. for 12 days and thereafter subjected to heat aging test. The results are shown in Table 1. In the table, the retention of strength means the percent (%) of the tensile strength at break of the test piece after subjected to the heat aging test to that before the heat aging test. The retention of elongation is calculated likewise.

TABLE 1

| Example No. | Retention of strength (%) | Retention of Elongation (%) |
| --- | --- | --- |
| Preparn. 1 | 55 | 41 |
| Example 1 | 68 | 94 |

TABLE 1-continued

| Example No. | Retention of strength (%) | Retention of Elongation (%) |
|---|---|---|
| Example 2 | 96 | 100 |
| Example 3 | 100 | 100 |
| Ref. Ex. 1 | 49 | 25 |
| Ref. Ex. 2 | 60 | 20 |

EXAMPLE 5

The same Dumbbell-shaped test pieces as prepared in Example 4 were kept in hot water of 100° C. for 5 days, and thereafter, the water resistance of the test pieces was measured, wherein the tensile strength at break and tensile elongation at break of the test pieces were measured before and after the hot water treatment and compared likewise. The results are shown in Table 2.

TABLE 2

| Example No. | Retention of strength (%) | Retention of Elongation (%) |
|---|---|---|
| Preparn. 1 | Broken (0) | Broken (0) |
| Example 1 | 45 | 50 |
| Example 2 | 68 | 100 |
| Example 3 | 53 | 78 |
| Ref. Ex. 1 | 0 | 0 |
| Ref. Ex. 2 | 0 | 0 |

EXAMPLE 6

The polyester type block copolymer prepared in Preparation 1, the following epoxy compound (I) and/or (II), the following ethylene-carboxylic acid copolymer (A) or (B), and triphenylphosphine were charged into a drum tumbler, and the mixture was stirred at room temperature for 30 minutes. The mixture was extruded with a biaxial extruder (40 mmφ) at 230° C. After cooling with water, the extruded product was cut to give chips. The chips were dried at 100° C. in vacuum, and the melt index of the resulting chips was measured. The results are shown in Table 3.

| Epoxy compound (I): | Polyethylene glycol phenylglycidyl ether |
|---|---|
| Epoxy compound (II): | Diethylene glycol diglycidyl ether |

Ethylene-carboxylic acid copolymer (A): It was prepared by copolymerizing ethylene (90 parts by weight) and acrylic acid (10 parts by weight), followed by neutralizing the carboxyl groups of the copolymer with sodium ion. The ionic copolymer had a melt index of 10 g/10 minutes, and a softening point of 70° C.

Ethylene-carboxylic acid copolymer (B): It was prepared by copolymerizing ethylene (80 parts by weight) and acrylic acid (20 parts by weight), followed by neutralizing the carboxyl groups of the copolymer with sodium ion. The ionic copolymer had a melt index of 0.9 g/10 minutes and a softening point of 61° C.

TABLE 3

| No. | Copolymer (part by weight) | Epoxy compound (part by weight) | | Ethylene-carboxylic acid copolymer (part by weight) | Triphenylphosphine (part by weight) | Melt index |
|---|---|---|---|---|---|---|
| 1 | 100 | (I) | 2.67 | — | 0.1 | 24.3 |
|   |     | (II) | 0.733 |   |     |      |
| 2 | 100 | (I) | 2.67 | (A) 5 | 0.1 | 5.3 |
|   |     | (II) | 0.733 |   |     |      |
| 3 | 100 | (I) | 2.67 | (A) 10 | 0.1 | 5.0 |
|   |     | (II) | 0.733 |   |     |      |
| 4 | 100 | (I) | 2.67 | (B) 10 | 0.1 | 3.4 |
|   |     | (II) | 0.733 |   |     |      |
| 5 | 100 | (I) | 1.31 | — | 0.1 | 15.9 |
|   |     | (II) | 1.1 |   |     |      |
| 6 | 100 | (I) | 1.31 | (B) 5 | 0.1 | 0.8 |
|   |     | (II) | 1.1 |   |     |      |
| 7 | 100 | (I) | 1.31 | (B) 10 | 0.1 | 0.6 |
|   |     | (II) | 1.1 |   |     |      |
| 8 | 100 | (II) | 0.733 | — | 0.1 | 22 |
| 9 | 100 | (II) | 0.733 | (B) 10 | 0.1 | 1.5 |

EXAMPLE 7

The polyester type block copolymer (100 parts by weight) prepared in Preparation 1, the epoxy compound (I) and/or (II) and ethylene-carboxylic acid copolymer (B) as used in Example 6 were mixed in the same manner as in Example 6 in amounts as shown in Table 4. Chips were prepared from the mixture in the same manner as in Example 6.

The chips were dried at 100° C. in vacuum, and then the melt index and acid value of the product were measured. Besides, after the product was kept at 80° C. in hot water for 2 weeks, the tensile strength at break of the resulting product was measured. These results are shown in Table 4.

TABLE 4

| No. | Epoxy compound (PHR*) | | Ethylene-carboxylic acid copolymer (B) (PHR) | Triphenylphosphine (PHR) | Melt index | Acid value (equivalent/$10^6$ g) | Retention of tensile strength (%) |
|---|---|---|---|---|---|---|---|
|   | (II) | (I) | | | | | |
| 1 | — | — | — | — | 52 | 65 | 6 |
| 2 | 1.0 | — | — | — | 48 | 40 | 10 |
| 3 | 1.0 | 1.3 | — | — | 49 | 35 | 18 |
| 4 | — | — | 10 | — | 5 | 63 | 7 |
| 5 | 1.0 | — | 10 | — | 0.5 | 40 | 45 |
| 6 | 1.0 | 1.3 | 10 | — | 2.0 | 35 | 48 |
| 7 | 1.0 | — | 10 | 0.1 | 0.4 | 20 | 87 |
| 8 | 1.0 | 1.3 | 10 | 0.1 | 0.6 | 9 | 98 |

*PHR: parts per hundred parts of resin

As is clear from Table 4, when an epoxy compound was used alone (Nos. 2 and 3), the increase of viscosity was small, but when an ethylene-carboxylic acid copolymer was used together with an epoxy compound (Nos. 5–8), the effect for increasing viscosity was large, and hence, the moldability of the product was improved. Besides, when a diepoxy compound and a monoepoxy compound were used together, hydrolysis resistance of the product was improved.

EXAMPLE 8

The polyester type block copolymer chips (1,000 g) prepared in Preparation 1, ethylene glycol diglycidyl ether and various compounds as shown in Table 5 in the stated amount were charged into a drum tumbler, and the mixture was stirred at room temperature for 30 minutes. The mixture was extruded with a biaxial extruder (40 mm$\phi$) at 230° C. After cooling with water, the extruded product was cut to give chips.

The chips were dried at 100° C. in vacuum. Melt index of the resulting chips was measured. The results are shown in Table 5.

TABLE 5

| No. | Epoxy compound (%) | Other compound Kind | Amount (PHR) | Melt index |
|---|---|---|---|---|
| 1 | — | — | — | 52 |
| 2 | 0.3 | Disodium dimerate | 0.5 | 15 |
| 3 | 0.5 | " | " | 4.0 |
| 4 | 0.8 | " | " | 1.0 |
| 5 | 1.0 | " | " | 0.5 |
| 6 | 0.8 | $CH_3(CH_2)_{10}COONa$ | 0.5 | 5.3 |
| 7 | 0.8 | $NaOOC(CH_2)_8COONa$ | 0.5 | 2.5 |
| 8 | 0.8 | Triphenylphosphine | 0.1 | 20.0 |
| 9 | 1.5 | " | " | 12.3 |

Besides, the chips obtained above were formed into a sheet (thickness: 2 mm) with hot-pressing, of which the tensile strength at break, tensile elongation at break and tapered wearing properties were measured. The results are shown in Table 6.

TABLE 6

| No. | Tensile strength at break (kg/cm$^2$) | Tensile elongation at break (%) | Tapered wearing (mg/ 1000 cycles) |
|---|---|---|---|
| 1 | 371 | 708 | 20 |
| 2 | 392 | 520 | 10 |
| 3 | 396 | 496 | 9 |
| 4 | 403 | 460 | 8 |
| 5 | 403 | 460 | 8 |
| 6 | 395 | 497 | 9 |
| 7 | 397 | 495 | 8 |
| 8 | 387 | 528 | 10 |
| 9 | 392 | 508 | 10 |

As is clear from the above Tables 5 and 6, the compositions of the present invention (Nos. 2-7) showed remarkable increase of melt viscosity and excellent mechanical properties.

EXAMPLE 9

The polyester type block copolymer chips (1.5 kg) prepared in Preparation 1, ethylene glycol diglycidyl ether (24.0 g) and triphenylphosphine (1.3 g) were charged into a drum tumbler, and the mixture was stirred at room temperature for 30 minutes. The mixture was extruded with a biaxial extruder (40 mm$\phi$) at 230° C. After cooling with water, the extruded product was cut to form chips. The resulting chips had a melt index of 12.3, a tensile strength at break of 392 kg/cm$^2$ and a tensile elongation at break of 508%.

To the chips was added sodium salt of dimer acid (0.4 PHR) and the mixture was treated in the same manner as described in Example 8. The chips thus obtained had a melt index of 1.2, a tensile strength at break of 397 kg/cm$^2$ and a tensile elongation at break of 493%.

The chips was formed into a sheet (thickness: 2 mm) with hot-pressing, from which a Dumbbell-shaped test piece was prepared. The test piece was kept in a gear oven at 140° C. for 12 days, and thereafter, the tensile strength at break and tensile elongation at break of the test piece were measured. Besides, a Dumbbell-shaped test piece prepared as above was kept in hot water 100° C. for 3 days, and thereafter, the tensile strength at break and tensile elongation at break thereof were also measured.

The composition incorporated with an epoxy compound and a phosphorus compound as prepared in the above first paragraph of this Example 9 and also a composition incorporated with disodium dimerate alone (for comparison purpose) were also tested in the same manner as described above.

The results are shown in Table 7.

TABLE 7

| | Heat resistance (140° C. × 12 days) | | Water resistance (100° C. × 3 days) | |
|---|---|---|---|---|
| No.* | Retention of strength (%) | Retention of elongation (%) | Retention of strength (%) | Retention of elongation (%) |
| 1 | 55 | 41 | 0 | 0 |
| 2 | 94 | 100 | 85 | 100 |
| 3 | 85 | 96 | 80 | 100 |

*No. 1: Composition incorporated with disodium dimerate alone
No. 2: Composition incorporated with an epoxy compound and a phosphorus compound
No. 3: Composition incorporated with an epoxy compound, a phosphorus compound and disodium dimerate

EXAMPLE 10

The polyester type block copolymer chips (1,000 g) prepared in Preparation 1, glycerine triglycidyl ether and various compounds as shown in Table 8 in the stated amount were charged into a drum tumbler, and the mixture was stirred at room temperature for 30 minutes. The mixture was treated with a biaxial extruder, followed by forming chips in the same manner as described in Example 8.

The chips thus obtained were dried at 100° C. in vacuum, and the melt index of the chips was measured. The results are shown in Table 8.

TABLE 8

| No. | Epoxy compound (%) | Other compound Kind | Amount (PHR) | Melt index |
|---|---|---|---|---|
| 1 | — | — | — | 52 |
| 2 | 0.5 | $CH_3(CH_2)_{10}COONa$ | 0.5 | 0.5 |
| 3 | 0.8 | Triphenylphosphine | 0.1 | 13 |

EXAMPLE 11

In the same manner as described in Example 1, except that pentaerythritol-tetrakis[3-(3,5-di-tert-butyl-4-hydroxy-phenyl)propionate](Irganox 1010 ®, manufactured by Ciba-Geigy, 4.5 g) was added in addition to triphenylphosphine and phenyl glycidyl ether, polyester type block copolymer composition chips were prepared.

EXAMPLE 12

In the same manner as described in Example 11, except that dilaurylthio dipropionate (Rasmit ®, manufactured by Daiichi Kogyo Yakuhin K.K., 4.5 g) was used instead of Irganox 1010 ®, chips were prepared.

EXAMPLE 13

In the same manner as described in Example 11, except that 4,4'-bis(α,α-dimethylbenzyl)diphenylamine (Naugard 445 ®, manufactured by Uniroyal Co., 4.5 g) was used instead of Irganox 1010 ®, chips were prepared.

EXAMPLE 14

In the same manner as described in Example 2, except that Irganox 1010 ® (4.5 g) was added in addition to triphenylphosphine and diethylene glycol diglycidyl ether, polyester type block copolymer composition chips were prepared.

EXAMPLE 15

In the same manner as described in Example 14, except that Rasmit ® (4.5 g) was used instead of Irganox 1010 ®, chips were prepared.

EXAMPLE 16

In the same manner as described in Example 14, except that Naugard 445 ® (4.5 g) was used instead of Irganox 1010 ®, chips were prepared.

REFERENCE EXAMPLE 3

The polyester type block copolymer (1.5 kg) prepared in Preparation 1 and Irganox 1010 ® (4.5 g) were mixed in an drum tumbler. The mixture was melt-extruded with an biaxial extruder at 230° C. After cooling with water, the extruded product was cut to form chips.

REFERENCE EXAMPLE 4

In the same manner as described in Reference Example 3, except that Naugard 445 ® (4.5 g) was used instead of Irganox 1010 ®, chips were prepared.

The chips prepared in Examples 11 to 16 and Reference Examples 3 and 4 were subjected to heat aging test by keeping in an oven at 150° C. for 16 days and 28 days. Thereafter, the tensile strength at break and tensile elongation at break before and after the heat aging test were measured, and the retention of strength and elongation were calculated. The results are shown in Table 9.

EXAMPLE 17

In the same manner as described in Example 1, except that 2-(2'-hydroxy-3',5'-di-tert-butylphenyl)-5-chlorobenzotriazole (Tinuvin 327 ®, manufactured by Ciba-Geigy, 4.5 g) was added in addition to triphenylphosphine and phenyl glycidyl ether, polyester type block copolymer composition chips were prepared.

EXAMPLE 18

In the same manner as described in Example 17, except that bis(2,2,6,6-tetramethyl-4-piperidyl) sebacate (Sanol LS-770 ®, manufactured by Sankyo K.K., 4.5 g) was used instead of Tinuvin 327 ®, chips were prepared.

EXAMPLE 19

In the same manner as described in Example 17, except that 2-hydroxy-4-n-octyloxybenzophenone (4.5 g) was used instead of Tinuvin 327 ®, chips were prepared.

EXAMPLE 20

In the same manner as described in Example 2, except that Tinuvin 327 ® (4.5 g) was added in addition to triphenylphosphine and diethylene glycol diglycidyl ether, polyester type block copolymer composition chips were prepared.

EXAMPLE 21

In the same manner as described in Example 20, except that Sanol LS-770 ® (4.5 g) was used instead of Tinuvin 327 ®, chips were prepared.

EXAMPLE 22

In the same manner as described in Example 20, except that 2-hydroxy-4-n-octyloxybenzophenone (4.5 g) was used instead of Tinuvin 327 ®, chips were prepared.

REFERENCE EXAMPLE 5

The polyester type block copolymer (1.5 kg) prepared in Preparation 1 and Tinuvin 327 ® (4.5 g) were mixed in a drum tumbler. The mixture was extruded with a biaxial extruder (40 mmØ) at 230° C. After cooling with water, the extruded product was cut to form chips.

REFERENCE EXAMPLE 6

TABLE 9

| | Ex. 11 | Ex. 12 | Ex. 13 | Ex. 14 | Ex. 15 | Ex. 16 | Ref. Ex. 3 | Ref. Ex. 4 |
|---|---|---|---|---|---|---|---|---|
| Retention of strength (%) | | | | | | | | |
| 16 days | 90 | 85 | 86 | 92 | 82 | 83 | 65 | 63 |
| 28 days | 88 | 68 | 70 | 86 | 71 | 70 | 0 | 0 |
| Retention of elongation (%) | | | | | | | | |
| 16 days | 125 | 121 | 118 | 125 | 120 | 116 | 115 | 110 |
| 28 days | 115 | 26 | 67 | 112 | 24 | 55 | 1 | 1 |

As is clear from Table 9, the compositions of the present invention showed far greater heat aging resistance in comparison with the compositions of reference examples.

In the same manner as described in Reference Example 5, except that Sanol LS-770 ® (4.5 g) was used instead of Tinuvin 327 ®, chips were prepared.

The chips as prepared in Examples 17 to 22 and Reference Examples 5 and 6 were subjected to weathering tests with fadeometer and weatherometer and QUV test for 200 hours and 400 hours. The results are shown in Tables 10, 11 and 12, respectively.

TABLE 10

| Weathering properties with fadeometer | | | | | | | | |
|---|---|---|---|---|---|---|---|---|
| | Ex. 17 | Ex. 18 | Ex. 19 | Ex. 20 | Ex. 21 | Ex. 22 | Ref. Ex. 5 | Ref. Ex. 6 |
| Retention of strength (%) | | | | | | | | |
| 200 hours | 98 | 90 | 89 | 99 | 97 | 96 | 75 | 71 |
| 400 hours | 95 | 88 | 86 | 96 | 94 | 93 | 58 | 55 |
| Retention of elongation (%) | | | | | | | | |
| 200 hours | 99 | 95 | 91 | 97 | 96 | 94 | 82 | 80 |
| 400 hours | 98 | 93 | 87 | 96 | 93 | 92 | 55 | 51 |

TABLE 11

| Weathering properties with weatherometer | | | | | | | | |
|---|---|---|---|---|---|---|---|---|
| | Ex. 17 | Ex. 18 | Ex. 19 | Ex. 20 | Ex. 21 | Ex. 22 | Ref. Ex. 5 | Ref. Ex. 6 |
| Retention of strength (%) | | | | | | | | |
| 200 hours | 100 | 98 | 99 | 99 | 98 | 98 | 50 | 48 |
| 400 hours | 99 | 97 | 96 | 96 | 96 | 97 | 43 | 42 |
| Retention of elongation (%) | | | | | | | | |
| 200 hours | 110 | 105 | 108 | 110 | 108 | 107 | 15 | 14 |
| 400 hours | 108 | 100 | 98 | 105 | 102 | 100 | 5 | 6 |

TABLE 12

| Weathering properies with QUV test | | | | | | | | |
|---|---|---|---|---|---|---|---|---|
| | Ex. 17 | Ex. 18 | Ex. 19 | Ex. 20 | Ex. 21 | Ex. 22 | Ref. Ex. 5 | Ref. Ex. 6 |
| Retention of strength (%) | | | | | | | | |
| 200 hours | 95 | 94 | 95 | 96 | 95 | 96 | 65 | 62 |
| 400 hours | 92 | 91 | 90 | 91 | 90 | 90 | 53 | 51 |
| Retention of elongation (%) | | | | | | | | |
| 200 hours | 98 | 97 | 95 | 99 | 97 | 96 | 58 | 58 |
| 400 hours | 95 | 92 | 91 | 96 | 91 | 92 | 15 | 17 |

As is clear from Tables 10, 11 and 12, the compositions of the present invention showed far greater weathering properties in comparison with the products of reference examples.

What is claimed is:

1. A polyester type block copolymer which comprises a polyester type block copolymer obtained from a crystalline aromatic polyester and a lactone in the ratio of 95/5 to 30/70 by weight, in melt-admixture with at least one epoxy compound, said epoxy compound being incorporated in an amount of 0.1 to 20% by weight based on the weight of the polyester type block copolymer, said epoxy compound being a member selected from the group consisting of mono-, di- and trifunctional epoxy compounds of the formula:

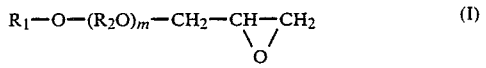

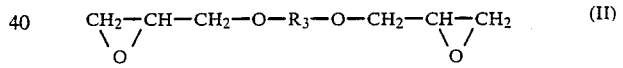

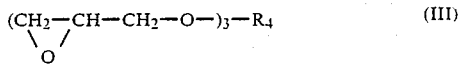

wherein $R_1$ is a hydrocarbon group having 1 to 10 carbon atoms, $R_2$ is an alkylene group having 1 to 4 carbon atoms, $R_3$ is a divalent hydrocarbon group having 1 to 20 carbon atoms or $-(R_2O)_m-R_2-$, $R_4$ is a trivalent hydrocarbon group having 3 to 20 carbon atoms, and m is an integer of 0 to 20.

2. A composition according to claim 1, wherein the epoxy compound is a combination of a monoepoxy compound and a di- or tri-epoxy compound.

* * * * *